Oct. 20, 1931.   M. L. MELETIO   1,828,541
MOUNT FOR RANGE FINDERS OR OTHER ATTACHMENTS
Filed April 5, 1930
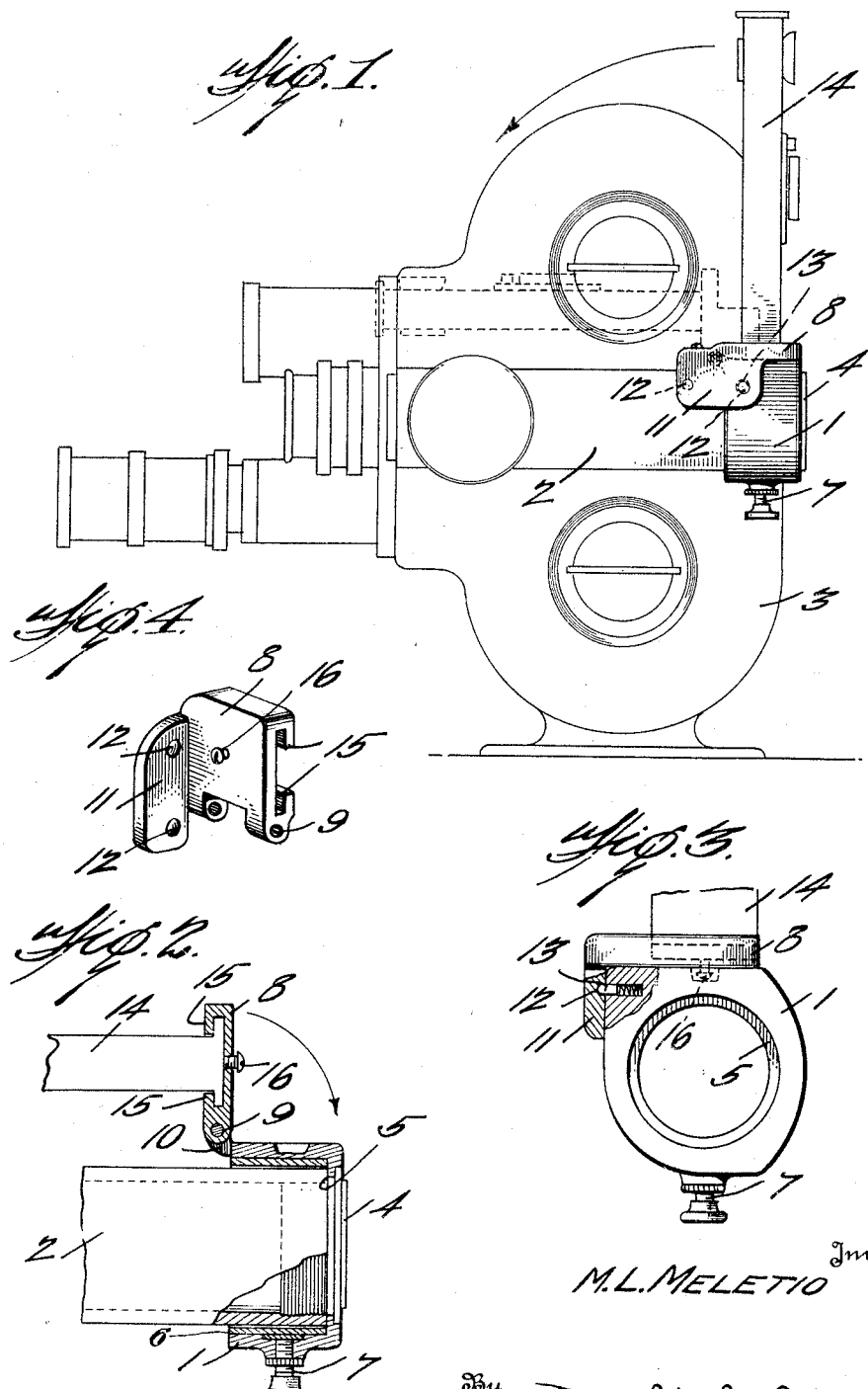
Inventor
M. L. MELETIO
By Donald L. Mayson,
Attorney Patented Oct. 20, 1931

1,828,541

UNITED STATES PATENT OFFICE

MONROE L. MELETIO, OF WASHINGTON, DISTRICT OF COLUMBIA

MOUNT FOR RANGE FINDERS OR OTHER ATTACHMENTS

Application filed April 5, 1930. Serial No. 441,905.

This invention relates to improvements in a mount for a range finder or other attachment for cameras, and more particularly to a mount which will be detachably supported upon the end of the view finder barrel of a moving picture camera, to be positively held in place by the eye piece of the finder, and to be further locked in position by a set screw.

An object of the invention is to provide an improved supporting mount for a range finder for moving picture cameras which may be quickly and detachably positioned upon the end of the view finder barrel and held in position thereon by the threaded eye piece of the view finder, and which will be so constructed that the range finder with the portion of the mount attached to the same may be swung into vertical position for use, or may be swung into horizontal position beside the camera when not in use.

Another object of the invention is to provide an improved supporting mount for range finders or other attachments for moving picture cameras which will readily slip or telescope over the end of the view finder barrel when the eye piece of the barrel is removed, and when the eye piece is again placed in the barrel will positively position and lock the mount in place.

A further object of the invention is to provide an improved detachable mount for a range finder or other attachment for moving picture cameras which may be positioned on either end of the view finder barrel of the camera, and which will be arranged to interchangeably receive the range finder or other attachment, and also having means to lock the same in fixed position on the mount.

A still further object of the invention is to provide a mount for a range finder or other attachment for a moving picture camera, which will be so constructed that the same may be positioned on the camera without injury to the camera by simply detachably positioning the same on the view finder barrel and to be held thereon by the eye piece of the barrel, as distinguished from screwing the mount on to the camera body as a permanent attachment.

Other objects will appear as the description proceeds.

In the accompanying drawings which form a part of my application,

Figure 1 is a side elevation of a moving picture camera showing my improved mount in position thereon and supporting a range finder;

Figure 2 is a sectional view through the mount showing the same mounted upon the end of a view finder barrel;

Figure 3 is a front elevation of the mount, the same being partially broken away to show the spring latch mechanism, and Figure 4 is a perspective view of the pivotal or range finder supporting portion of the mount.

Like characters of reference are used throughout the following specification and the accompanying drawings to designate corresponding parts.

In carrying out my invention, I provide a substantially U-shape body portion 1 adapted to slip or telescope over the end of the view finder barrel 2 of a moving picture camera 3, after the eye piece 4 has been removed. The body portion 1 is unrestricted at one end, but is provided with an interiorly formed annular locking shoulder or bearing 5 which is slightly spaced from the adjacent opposite end of the said body portion, and is adapted to abut up against the end of the barrel 2, after which the eye piece 4 will be replaced and screwed tight against the opposite side of the locking shoulder or bearing 5, thereby positively positioning the mount upon the view finder barrel 2. A guard or protecting strip 6 is positioned within the body portion 1 so that the finish of the camera or the barrel 2 will not be injured. A set screw 7 is extended through the lower portion of the body 1, and is adapted to be tightened against the barrel 2, thereby additionally locking the mount upon the said barrel.

A range finder or attachment supporting member 8 is hinged at 9 to the forwardly extending bearing portion 10 on the body 1, and is formed with a laterally extending guide plate 11 in which the locking recesses 12 are positioned. A spring pressed locking pin 13 is positioned within the body 1 and cooperates with the locking recesses 12 in the guide plate 11, as clearly illustrated in Figure 3 of the drawings. From the foregoing description, it will be apparent that the suporting member 8 may be lowered to a position parallel with the upper surface of the body 1, or it may be raised to a vertical position, as shown in dotted lines in Figure 1 of the drawings. at which time, the range finder 14 will be in inoperative position. Conversely, when the member 8 is in horizontal position, the range finder 14 will be held in a vertical or operative position, whereupon the range may be quickly and accurately ascertained.

A T-slot 15 will be formed in the supporting member 8 for the reception of the range finder 14, and a set screw 16 extending through the said member 8 will positively hold the range finder in locked position therein. Only the end of the T-slot 15 towards the body of the camera is open, thereby necessitating the positioning of the range finder therein before the mount is positioned upon the view finder barrel.

The locking recesses 12 and the locking pin 13 formed respectively in the guide plate 11 and body 1 are so related that the range finder supporting member 8 will be readily latched in its raised or lowered position, as desired.

It will be understood that while I have illustrated the mount as supporting a range finder, that it may equally well support any attachment or adjunct to a camera, and that the mount may be used equally well upon either end of the view finder barrel.

Many minor changes in detail of construction may be resorted to without departure from the spirit of the invention.

Having thus described my invention what I claim as new and desire to secure by Letters Patent of the United States is:

1. A supporting mount for a range finder or other attachment for a camera adapted to be detachably positioned upon the view finder barrel of a camera, means on said mount cooperating with the eye piece of the view finder for locking the same thereon, additional means carried by the mount engageable with the barrel for further locking the same in position, and means for selectively changing the relative position between the range finder and said mount.

2. A supporting mount for a range finder or other attachment for a camera adapted to be detachably positioned upon the view finder barrel of a camera comprising a body portion having dual means for engaging said barrel, a supporting member pivotally mounted on said body member, means on said supporting member for engaging the camera attachment, and guide means carried by said supporting member cooperating with said body portion.

3. A supporting mount for a range finder or other attachment for a camera adapted to be detachably positioned upon the view finder barrel of a camera comprising a body portion having dual means for engaging said barrel, a supporting member pivotally mounted on said body member, means on said supporting member for positively engaging the camera attachment, means on said supporting member for locking the attachment therein, and guide means carried by said supporting member cooperating with said body portion.

4. A supporting mount for a range finder or other attachment for a camera adapted to be detachably positioned upon the view finder barrel of a camera comprising a body portion having dual means for engaging said barrel, a supporting member pivotally mounted on said body member, means on said supporting member for positively engaging the camera attachment, means on the supporting member for locking the attachment therein, guide means carried by the supporting member cooperating with the body portion, and a latch mechanism for holding the supporting member in adjusted positions.

In testimony whereof I affix my signature.

MONROE L. MELETIO.